No. 825,160. PATENTED JULY 3, 1906.
P. T. SIEVERT.
PROCESS OF AND APPARATUS FOR BLOWING HOLLOW GLASS ARTICLES.
APPLICATION FILED JAN. 7, 1905.
4 SHEETS—SHEET 1.
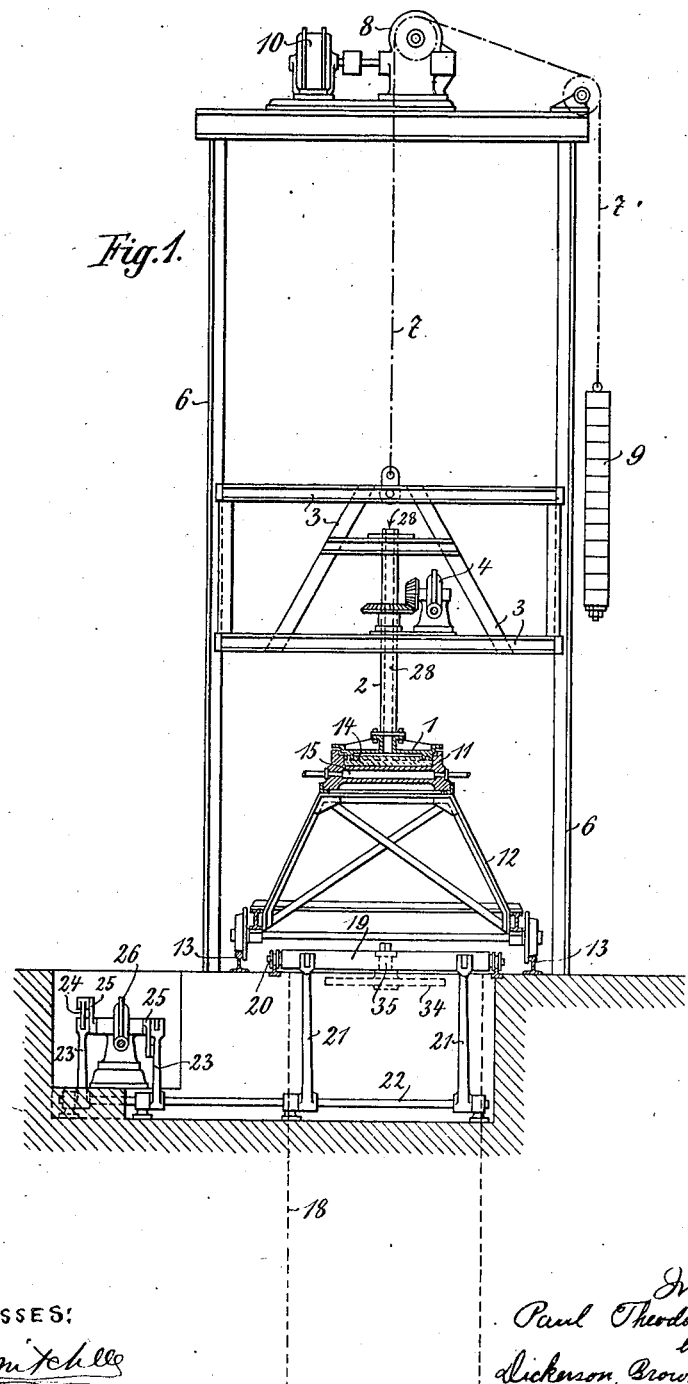

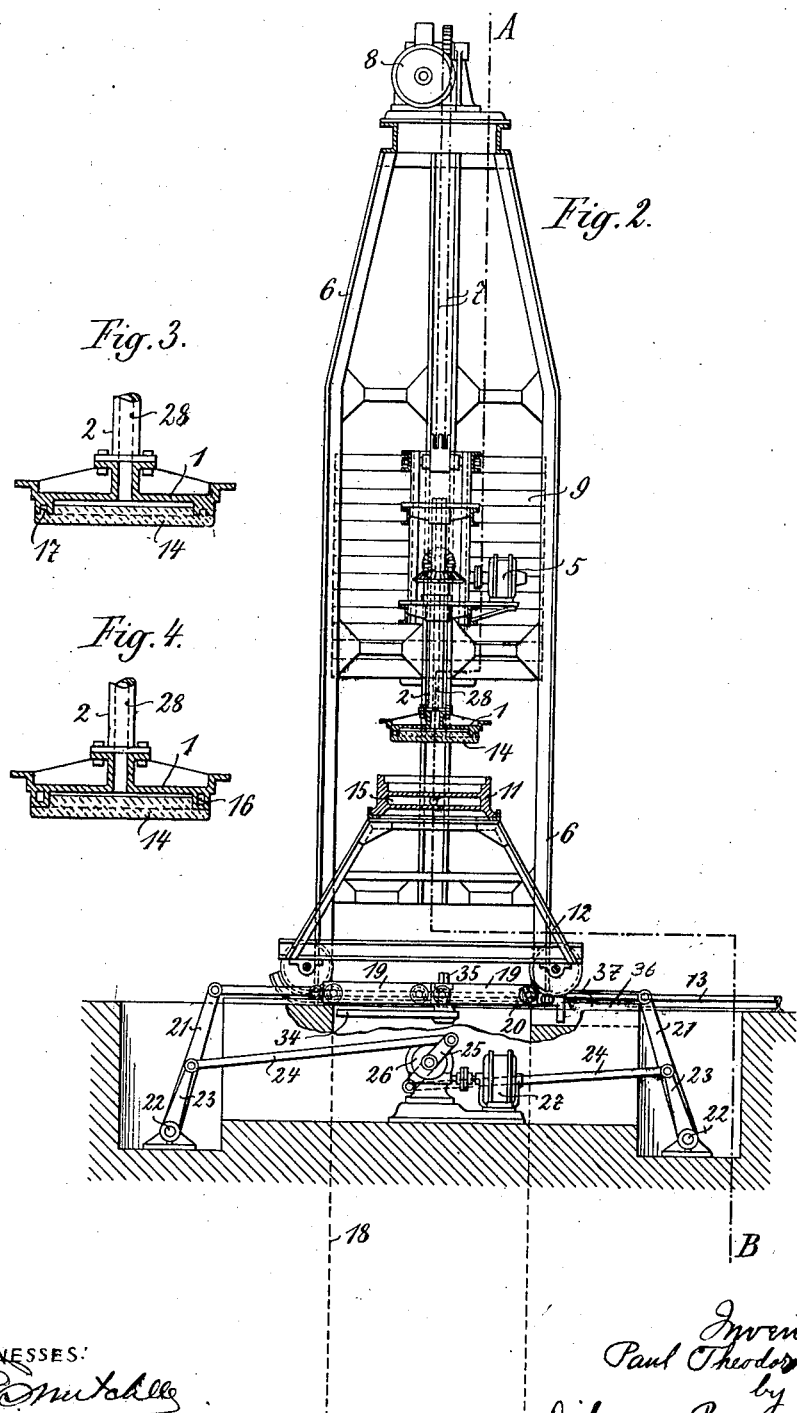

No. 825,160. PATENTED JULY 3, 1906.
P. T. SIEVERT.
PROCESS OF AND APPARATUS FOR BLOWING HOLLOW GLASS ARTICLES.
APPLICATION FILED JAN. 7, 1905.
4 SHEETS—SHEET 3.
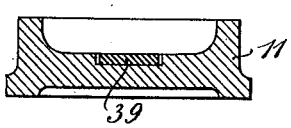
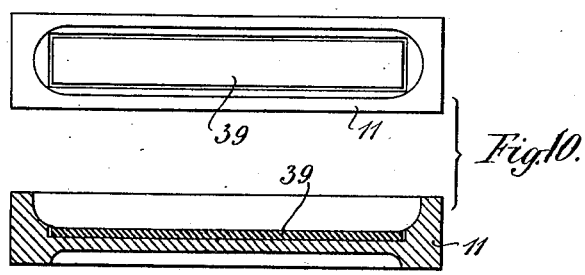
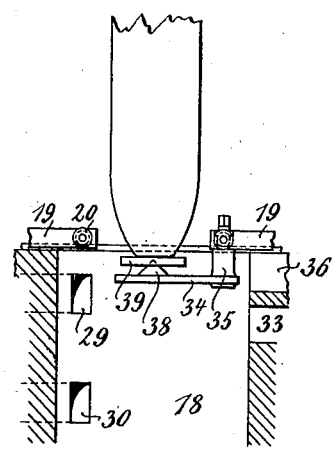

No. 825,160. PATENTED JULY 3, 1906.
P. T. SIEVERT.
PROCESS OF AND APPARATUS FOR BLOWING HOLLOW GLASS ARTICLES.
APPLICATION FILED JAN. 7, 1905.
4 SHEETS—SHEET 4.
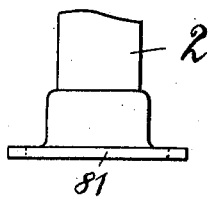
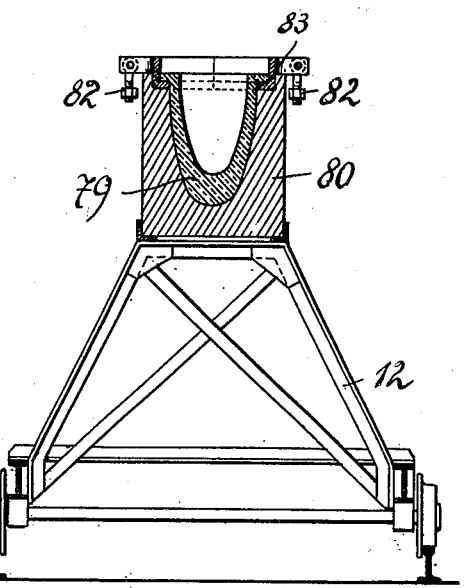
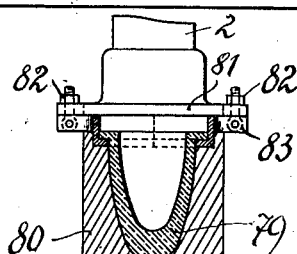

UNITED STATES PATENT OFFICE.

PAUL THEODOR SIEVERT, OF DRESDEN, GERMANY.

PROCESS OF AND APPARATUS FOR BLOWING HOLLOW GLASS ARTICLES.

No. 825,160.

Specification of Letters Patent.

Patented July 3, 1906.

Application filed January 7, 1905. Serial No. 240,003.

*To all whom it may concern:*

Be it known that I, PAUL THEODOR SIEVERT, a subject of the German Emperor, residing in Dresden, in the Kingdom of Saxony, Germany, have invented certain new and useful Improvements in Processes and Apparatus for Blowing Hollow Glass Articles, of which the following is a specification.

My invention relates to a process of and apparatus for blowing hollow glass articles from a plastic glass mass suspended by a carrier, which glass mass may be either a cake or layer of glass held at its outer edges in a frame or a previously-formed sack-shaped glass vessel, the previous formation of which may be effected in any desired manner—for instance, by pressing the metal into a pressure-mold—in which case the vessel may be fixed on the carrier by means of a neck-piece or in any desired or well-known manner. Hitherto this process of blowing hollow glass articles has been carried out by utilizing as much as possible the heat originally possessed by the glass when the plastic glass layer is taken up by the frame or when the glass vessel is being formed. In all cases the apparatus for carrying out the process was made with a view to beginning the extension or blowing of the glass mass as soon as possible after the above-named operations had been effected, and the glass mass was not reheated until this became necessary by reason of its decreased plasticity. By this means, however, it has not been possible to produce reliable and satisfactory results. It is observed that very frequently the thickness of the wall of the hollow article remains much too great at its upper end and that this error is not corrected by the reheating of the article. Careful experiments have now shown that the reason of this defect is that at the beginning of the process of blowing or shaping the distribution of heat in the glass mass cannot under any ordinary circumstances be uniform. That portion of the glass near the edge of the cake or vessel is cooled down considerably more quickly than the more centrally-located portion, as the heat rapidly leaves the outer portions by convection to the carrier, which is the frame, collar, or the like, the part of which engaging with the glass consists ordinarily of iron or shaped metal. If the glass mass is blown or shaped while in this unequally-heated condition, the central, and consequently softer, part of the glass becomes extended much more quickly than the outer, and consequently cooler, portion, the result being that the walls of the hollow article are too thick in their upper parts.

The present invention is based upon the discovery of an improved method by which these defects are remedied. This consists in delaying the extension or shaping of the glass so as not to depend chiefly upon the heat present at the beginning of the process after the carrier has taken up the glass cake or mass. On the contrary, the glass mass, which is supported at its central portion by a mold used for its preliminary formation, is first of all allowed to cool to such an extent that it will no longer sink in the middle under the action of gravity, and the cake is then heated afresh in a suitably-arranged heating-chamber or fire-drum in order to bring the whole mass to a uniform temperature, after which and not until which the extension or shaping of the glass is begun. By this method the above-described defect is remedied, as the outer parts of the glass cake or vessel become extended to the same degree as the central portion and the thickness of the wall becomes practically uniform or may be controlled as desired. In order to secure an approximately even cooling of the glass throughout its entire mass, I may also provide means for the relatively rapid cooling of the central portion of the mass. Where the mass is artificially cooled by introducing a fluid, as air, into the mold, any well-known means may be employed for increasing the volume of air supplied to the central part of such mold. All the advantage of this more rapid central cooling may be gained by giving the molds a special shape, as hereinafter described.

In the example of the apparatus suitable for carrying out the process of my invention illustrated in the drawings I have shown means for carrying out the particular form of my invention in which the glass mass in the form of a plastic cake is held by a frame determining the periphery of the article to be produced, which frame is suspended directly above the mold, so that the mass of glass being attached to the frame the mold may be removed from beneath the mass.

In the drawings, Figure 1 is a front elevation of a machine embodying a preferred form of my invention, parts of the same being in vertical section. Fig. 2 is a side elevation of the machine, the parts being disposed in different position and certain parts being, as before, in section. Figs. 3 and 4 are vertical sections of two different modifications of a portion of my device. Figs. 5, 6, and 7 show various modifications of the mold, which forms a part of the device. Figs. 8 and 9 are partial elevations, partly in section, of a modified form of the device. Fig. 10 shows a modified form of heating-chamber.

1 designates a carrier consisting of a frame which may have any desired form and which, as shown, is suspended from a shaft 2, rotatably supported on a frame 3. The rotation of the shaft is effected through a worm-gear 4, which is driven by any suitable motor, shown as an electric motor 5. The frame 3 is capable of vertical motion in the main frame 6 of the machine and is suspended by a cable 7, which runs over a winch 8 and carries at its free end a suitable counterpoise 9. The winch 8 may be rotated by means of a motor 10, whereby the slide-frame 3 and the carrying-frame 1 are raised and lowered as desired.

11 designates a mold into which the molten metal is poured, which mold rests upon a carriage 12, running upon rails 13. The molten metal is poured into the mold 11, which is then run under the machine-frame 6 and brought into vertical alinement with the frame 1. The frame is then lowered upon the mold 11, as shown in Fig. 1, the frame preferably having been previously heated, which may be conveniently accomplished by lowering it into the heating-chamber or firedrum 18. The molten metal or mass of glass now becomes engaged with the frame 1, so that it will remain suspended from the frame when the latter is raised.

In the carrying out of the process and in the use of the machine herein described therefor the parts are suffered to remain in the position shown in Fig. 1, in which the frame 1 rests upon the edges of the mold 11 until the molten metal 14 has cooled down, so that that portion thereof resting upon the central portion of the mold is below the flowing-point. The carrier 1 is then raised to the position shown in Fig. 2 of the drawings, lifting the glass cake 14 out of the mold 11, the cake, although still plastic being sufficiently cooled so that it remains in an approximately level form, as shown. To accelerate this desired partial cooling of the glass cake, the mold 11 may be provided with a channel 15, through which a cooling fluid, as cold air, may be introduced. In the same way the frame 1 may be provided with a cooling-channel 16, as shown in Fig. 4 of the drawings. In the form of the frame shown in Fig. 3 of the drawings the annular portion or periphery of the frame is formed with a groove or recess 17, which is brought into contact with the edge of the molten metal or glass cake. If this groove is sufficiently deep so that the glass does not completely fill it, a cooling fluid may be conducted therethrough.

When the frame 1 has been raised, as shown in Fig. 2, to lift the glass cake 14 out of the mold 11, the carriage 12, carrying the mold, is drawn aside. The frame 1, with the glass cake 14 suspended therefrom, may then be lowered into the heating-chamber 18. This latter is situated directly in the vertical path of the frame 1 for purposes which will hereinafter very clearly appear. The chamber 18 is ordinarily covered by covers 19, carried on wheels 20, so that they may be shifted toward either side or both sides of the opening of the chamber 18. Preferably they are withdrawn in both directions by the system of levers 21 22 23 24 25 by means of a motor 27 engaging with a worm-gear 26. When the glass cake or mass has been heated to an approximately uniform temperature, the frame 1 is again raised and the covers 19 brought together over the chamber 18. The mass of glass being suspended from its periphery only, it will, under the action of gravity, extend downwardly, forming a bell-shaped body. This extension may be assisted, if desired, by the introduction of air or other fluid under pressure through the bore 28 of the shaft 2 or in any other desired manner.

As the mass of glass has been uniformly heated throughout, the extension of its walls will take place uniformly from their upper edges, so that the cylindrical wall produced will be of approximately even thickness throughout. When the glass has so far cooled that its further extension is impracticable, it may again be lowered into the heating-chamber 18 and reheated for further treatment, resulting in its further extension.

In Figs. 5, 6, and 7 of the drawings I have shown molds 11$^a$, 11$^b$, and 11$^c$ of different forms, all of which are adapted to produce a relatively rapid cooling of the central portion of the glass cake or disk molded therein. This is effected both by making the glass cake thinner at its central portion than at its edges and also by providing a greater mass of metal in the center of the mold, by which its heat capacity is increased. In Fig. 5 the mold is shown with a bottom 60, having the form of a segment of a sphere. In Fig. 6 the bottom 60$^b$ is in the form of a raised disk of less diameter than the bottom of the mold. In Fig. 7 the part 60$^c$ of the mold is very considerably raised in proportion to the depth of the mold. It is obvious that many of these forms or any modification thereof may be advantageously employed in accordance with the desired shape of the article to be produced.

The devices thus far described have shown a mold of flat form for producing a glass cake. As already stated, however, my invention contemplates the blowing of the glass article from a previously-formed sack-shaped glass vessel. In Figs. 8 and 9 I have shown the sack-shaped mold 80, in which the glass mass 79 is cast in the desired shape. The mold is then set upon the carriage and brought in proper alinement in the machine. On the carrier 2 a plate 81 is fastened, which may be connected, by means of screws 82 or the like, with the neck-piece 83 of the mold. The glass mass 79 when sufficiently cooled is then raised by the carrier and treated in the manner above described.

In Fig. 10 of the drawings I have shown a modified form of heating-chamber, in which is provided a plurality of vertically-disposed inlets for the heating medium, as gas or other products of combustion. These are numbered, respectively, 29, 30, 31, and 32 and may be provided with valves (not shown) for closing or opening each of them separately or any of them together, as desired. It is evident that the effect of this will be to heat different zones of the partially-formed glass cylinder, so as to secure its greater fluidity of the said zones and its consequent greater extension at any point where the cylinder may be found too thick relatively to the other parts when the cylinder is again raised for further extension.

It is evident that my invention so far as it relates to the process of manufacturing glass articles may be carried out by a machine or device differing in many particulars from that herein shown and that that portion of my invention which relates to the machine itself may be embodied in variously-modified forms. It is also evident that parts of the device might be used without the others. Thus, e. g., the means for rotating the mass of glass during its extension might be omitted. The advantage of placing all the parts, including the heating-chamber 18, in a vertically-axial line lies particularly in that any lateral motion of the glass mass during extension by which its configuration would be injured is prevented.

What I claim is—

1. A process of manufacturing hollow glass articles comprising: casting the metal in a mold, cooling the glass in the mold until the metal resting upon the central portion of the mold is below the flowing-point, removing the partially-cooled mass from the mold, reheating the mass to an approximately uniform flowing temperature, and treating the mass to extend its walls in approximately even thickness.

2. A process of making hollow glassware comprising: casting the metal in a mold, cooling the glass in the mold until the metal resting upon the central portion of the mold is below the flowing-point, removing the partially-cooled mass from the mold, reheating the mass to an approximately uniform flowing temperature, and suspending the mass so as to secure the extension of its walls in approximately even thickness.

3. A process of making hollow glassware comprising: casting the metal in a mold, cooling the glass in the mold until the metal resting upon the central portion of the mold is below the flowing-point, removing the partially-cooled mass from the mold, reheating the mass to an approximately uniform flowing temperature, suspending the mass so as to secure the extension of its walls in approximately even thickness, and assisting the extension of the walls by the introduction thereinto of a fluid under pressure.

4. A process of making hollow glassware comprising: casting the metal in a mold, cooling the glass in the mold until the metal resting upon the central portion of the mold is below the flowing-point, removing the partially-cooled mass from the mold, reheating the mass to an approximately uniform flowing temperature, suspending the mass so as to secure the extension of its walls in approximately even thickness, and rotating the mass during extension.

5. A process of making hollow glassware comprising: casting the metal in a mold, cooling the glass in the mold until the metal resting upon the central portion of the mold is below the flowing-point, removing the partially-cooled mass from the mold, reheating the mass to an approximately uniform flowing temperature, suspending the mass so as to secure the extension of its walls in approximately even thickness, assisting the extension of the walls by the introduction thereinto of a fluid under pressure, and rotating the mass during extension.

6. A process of manufacturing hollow glass articles comprising: casting the metal in a mold, cooling the glass in the mold until the metal resting upon the central portion of the mold is below the flowing-point, removing the partially-cooled mass from the mold, reheating the mass to an approximately uniform flowing temperature, treating the mass to extend its walls in approximately even thickness, again reheating the partially-formed article, and again treating it to further extend its walls.

7. A process of manufacturing hollow glass articles comprising: casting the metal in a mold, cooling the glass in the mold until the metal resting upon the central portion of the mold is below the flowing-point, removing the partially-cooled mass from the mold, reheating the mass to an approximately uniform flowing temperature, treating the mass to extend its walls in approximately even thickness, exposing the partially-formed article to heating means so distributed as to unequally heat predetermined portions of its walls, and again treating it to further extend the walls.

8. A process of manufacturing hollow glass articles comprising: casting the metal in a mold, cooling the glass in the mold until the metal resting upon the central portion of the mold is below the flowing-point, adhering a carrier to the periphery of the cast glass, cooling the glass at its peripheral attachment to the carrier, removing the partially-cooled mass from the mold, reheating the mass to an approximately uniform flowing temperature, and treating the mass to extend its walls in approximately even thickness.

9. A machine for making hollow glass articles comprising: a mold for casting a glass mass, a suspended carrying-frame for attachment to the periphery of the mass while the mass is in the mold, means for raising the frame, means for removing the mold from beneath the frame after the mass is partially cooled, and a heating-chamber below and in vertical alinement with the frame.

10. A machine for making hollow glass articles comprising: a mold for casting a glass mass, a suspended carrying-frame for attachment to the periphery of the mass while the mass is in the mold, means for raising the frame, means for removing the mold from beneath the frame after the mass is partially cooled, a heating-chamber below and in vertical alinement with the frame, and a movable cover on the heating-chamber 11. A machine for making hollow glass articles comprising: a mold for casting a glass mass, means forming a cooling-chamber in said mold, a suspended carrying-frame for attachment to the periphery of the mass while the mass is in the mold, means for raising the frame, means for removing the mold from beneath the frame after the mass is partially cooled, and a heating-chamber beneath and in vertical alinement with the frame.

12. A machine for making hollow glass articles comprising: a mold for casting a glass mass, a suspended carrying-frame for attachment to the periphery of the mass while the mass is in the mold, means in the frame forming a cooling-chamber adjacent such periphery, means for raising the frame, means for removing the mold from beneath the frame after the mass is partially cooled, and a heating-chamber beneath and in vertical alinement with the frame.

13. A machine for making hollow glass articles comprising: a mold for casting a glass mass, the bottom of said mold having a raised central portion, a suspended carrying-frame for attachment to the periphery of the mass while the mass is in the mold, means for raising the frame, means for removing the mold from beneath the frame after the mass is partially cooled, and a heating-chamber below and in vertical alinement with the frame.

14. A machine for making hollow glass articles comprising: a mold for casting a glass mass, a suspended carrying-frame for attachment to the periphery of the mass while the mass is in the mold, means for raising the frame, means for removing the mold from beneath the frame after the mass is partially cooled, and a heating-chamber below and in vertical alinement with the frame, said heating-chamber being formed with a plurality of vertically-disposed inlets for the heating agent.

In witness whereof I have hereunto signed my name, this 21st day of December, 1904, in the presence of two subscribing witnesses.

PAUL THEODOR SIEVERT.

Witnesses:
　PAUL E. SCHILLING,
　PAUL ARRAS.